United States Patent [19]
Ching

[11] 3,781,685
[45] Dec. 25, 1973

[54] DIFFERENTIAL PULSE CODE COMMUNICATIONS SYSTEM HAVING DUAL QUANTIZATION SCHEMES

[75] Inventor: Yau Chau Ching, Morganville, N.J.

[73] Assignee: Bell Telephone Laboratories, Incorporated, Murray Hill, N.J.

[22] Filed: Nov. 13, 1972

[21] Appl. No.: 306,018

[52] U.S. Cl. ............ 325/38 B, 179/15 AD, 325/13, 325/42, 325/141, 325/324, 332/11 D
[51] Int. Cl. .......................... H04b 1/00, H04b 7/00
[58] Field of Search .................. 325/38 R, 38 B, 13, 325/42, 141, 321, 323, 324; 179/15 AP, 15 AV, 15 AD; 332/11 R, 11 D

[56] References Cited

UNITED STATES PATENTS 3,609,552 9/1971 Limb ................................ 325/38 B

*Primary Examiner*—Robert L. Richardson
*Assistant Examiner*—Marc E. Bookbinder
*Attorney*—W. L. Keefauver et al.

[57] ABSTRACT

A differential pulse code communications system is disclosed in which a digital difference signal having a higher number of quantization levels is transmitted to a distant receiver wherein the received higher grade quality digital signal is degraded, for re-transmission, to a digital signal having a lesser number of quantization levels without introducing an additional quantization error component into the system. In the transmitter, the transmitted higher grade quality difference signals are degraded to the lower grade quality digital signals before being digitally accumulated for subtraction from the input signal. At the receiver, the higher grade quality transmitted difference signals are similarly degraded to the lower grade quality digital signals and digitally accumulated. The higher grade quality reconstruction of the input signal is obtained by summing the received higher grade quality difference signal plus the accumulated lower grade quality digital signals. The lower grade quality digital difference signal derived from the higher grade quality digital signal may be re-transmitted to another distant location with a quantization error equivalent to the error introduced by quantizing the input signal to a difference signal having the fewer number of quantization levels.

8 Claims, 7 Drawing Figures

QUANTIZING SCALES

DIFFERENTIAL PULSE CODE COMMUNICATIONS SYSTEM HAVING DUAL QUANTIZATION SCHEMES

BACKGROUND OF THE INVENTION

This invention relates to the reduction of quantization error in differential pulse code communications systems.

In prior art differential pulse code communications systems the difference between the input message signal at a given sample instant and the absolute magnitude of the coded signal at the previous sample instant is quantized into a digital signal having a predetermined number of discrete levels. The greater the number of quantization levels into which the difference signal may be quantized, the smaller the quantization error, and therefore the "closer" the decoded signal will approximate the input signal. However, as the number of quantization levels increases, more bits are required to encode each quantization level into digital format. The number of bits that may be employed is limited by the information-carrying capacity of the transmission channel which must have a wide enough bandwidth to transmit the digital signal. The maximum number of quantization levels that can be transmitted for each sampled difference is thus determined by the bandwidth of the transmission channel.

At the receiver in prior art differential pulse code communications systems, the received digital difference signals are accumulated and the analog signal is recovered and fed to a utilization device. However, it may also be necessary to re-transmit the digital signal to a second receiver at another distant location. As noted above, the number of quantization levels which may be transmitted are determined by channel bandwidth. However, the transmission channel over which the digital signal must be re-transmitted may not have sufficient information-carrying capacity to re-transmit the received digital signal. Therefore, the received higher grade quality signal must be degraded to a signal having fewer quantization levels before it can be re-transmitted over the transmission channel having the narrower bandwidth. The resultant quantization error of the re-transmitted digital signal is thus the sum of the quantization error incurred by degrading the high grade quality signal to a lower grade quality signal for re-transmission plus the quantization incurred by converting the analog difference signal to its quantized digital representation. The total quantization error of the re-transmitted signal is greater than the quantization error that would have resulted had the analog difference signal been originally quantized into the lower grade quality signal. Alternatively, in the prior art systems, the number of levels into which the analog difference signal is quantized can be limited to the information-carrying capacity of the re-transmission channel in order to eliminate double quantization error components and signal mistracking. In such systems, however, the lower quality signal is supplied to the utilization device at the first receiver rather than the higher quality signal.

An object of this invention is, therefore, to quantize and transmit a differential signal in such a manner that a higher grade quality signal may be transmitted to a receiver where it may be systematically degraded to a lower quality signal for re-transmission without introducing additional quantization error into the system.

SUMMARY OF THE INVENTION

In the transmitter for the differential pulse code communications system of the present invention, the difference signal input to the sampling and quantizing network is formed by subtracting a feedback signal from the input message signal. The sampling and quantizing circuit encodes the difference signal into a digital signal having a predetermined number of quantization levels for transmission to a distant receiver. Unlike prior art differential pulse code transmitters wherein the feedback signal is representative of the accumulation of the previously quantized difference signals, the quantized digital difference signal in accordance with the present invention is degraded by a level converter prior to being accumulated. The level converter, connected to the output of the sampling and quantizing circuit, transforms the digital difference signal into a digital signal having a fewer number of quantization levels. A digital accumulator, connected to the output of the level converter, accumulates the lower grade quality quantized difference signals to form a lower grade quality digital representation of the absolute magnitude of the input message signal. The feedback signal subtracted from the input message signal is a conversion of the lower grade quality digital representation of the input message signal. Therefore, at a given sample instant, the higher grade quality digital representation of the absolute magnitude of the input message signal is equal to the difference signal quantized by the sampling and quantizing circuit at that sample instant, plus the accumulated lower grade quality digital signal of the previous sample instant.

The higher grade quality signal, and the lower grade quality signal may both be recovered at the receiver of the present invention. The transmitted higher grade quality difference signal is degraded by a level converter to the lower quality grade digital difference signal and accumulated with previously combined difference signals to form a lower grade quality digital representation of the input message signal. At each sample instant, the higher grade quality signal is thus recovered by summing the received higher grade quality difference signal with the accumulated lower grade quality signal of the previous sample instant.

Since each received higher grade quality difference signal can be transformed into a lower grade quality signal equivalent to the lower grade quality signal in the feedback path at the transmitter, the lower grade quality difference signal may be re-transmitted to another distant location without introducing additional quantization error into the system.

BRIEF DESCRIPTION OF THE DRAWINGS

FIG. 2A is arranged to the left of FIG. 2B comprise a differential pulse code communications system embodying the present invention.

DETAILED DESCRIPTION

Figure 1:
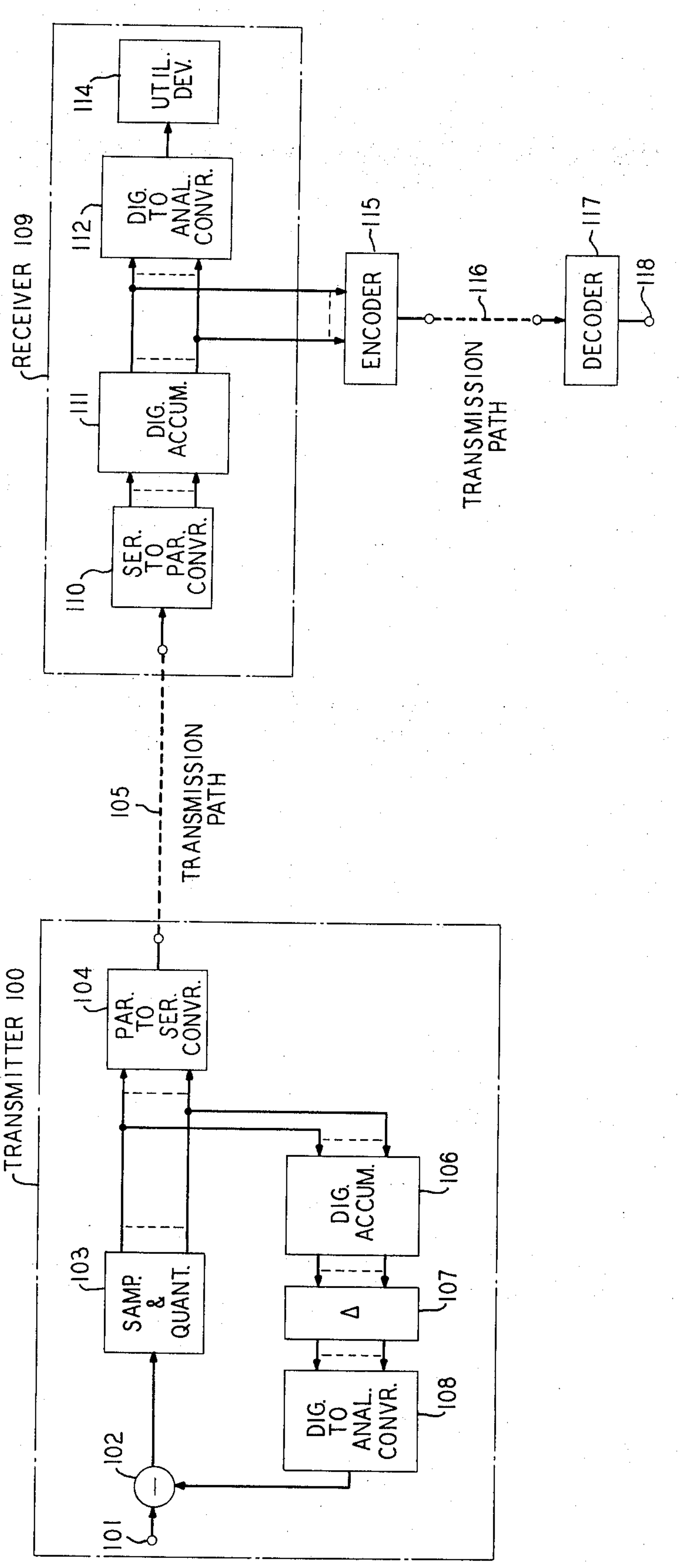
FIG. 1 PRIOR ART
FIG. 1 is a prior art differential pulse code communications system.

FIG. 1 illustrates a prior art differential pulse code communications system in which differential signals are quantized and encoded for transmission to a distant receiver. At transmitter 100, an analog message signal is applied to input terminal 101 and passed through subtractor circuit 102 to sampler and quantizer circuit 103. The difference signal at the output of subtractor circuit 102 is sampled at periodic intervals and quantized to a predetermined number of discrete levels. For present illustrative purposes, it will be assumed that the difference signal is quantized into 24 levels by sampler and quantizer circuit 103. Also for present illustrative purposes, it will be additionally assumed that the output of sampler and quantizer circuit 103 is a pulse code representing the magnitude of the difference signal by one of the 24 quantization levels. The magnitude of each of the 24 quantization levels is represented by a unique combination of the ON and OFF conditions of 8 parallel leads at the output of sampler and quantizer circuit 103. Parallel-to-serial converter 104, connected to the output leads of sampler and quantizer circuit 103, converts the pulse code at the output of sampler and quantizer circuit 103 to a variable length code for serial digital transmission over transmission path 105 to receiver 109.

The output leads of sampler and quantizer circuit 103 are also connected to digital accumulator 106. Accumulator 106 digitally accumulates the code magnitudes of each sampled difference signal. At a given sample instant, the 8-bit pulse code appearing on the output leads of digital accumulator 106 represents the absolute magnitude of the coded input message signal. Delay network 107 delays the pulse code appearing at the output of digital accumulator 106 by one sample instant. Digital-to-analog converter 108 converts the 8-bit delayed accumulated pulse code on the output leads of delay network 107 to an analog signal representative of the amplitude of the coded digital signal. The output of digital-to-analog converter 108 is connected to a second input of subtractor circuit 102 and the difference signal formed therein is equal to the difference between the input message signal at a given sample instant and the analog representation of the absolute magnitude of the coded input message signal at the previous sample instant.

As heretofore noted, the 8-bit parallel data at the output of sampler and quantizer circuit 103 is coded into a variable length code and converted to serial format by parallel-to-serial converter 104 for transmission over transmission path 105 to receiver 109. At receiver 109, serial-to-parallel converter 110 decodes the transmitted variable length code and produces a pulse code on the eight output leads equivalent to the 8-bit pulse code on the output leads of sampler and quantizer circuit 103. The output leads of serial-to-parallel converter 110 are connected to digital accumulator 111 and a pulse code is produced therein, representative of the absolute magnitude of the coded input message signal. Digital-to-analog converter 112 converts the 8-bit pulse code on the output leads of accumulator 111 into analog format where the analog signal, representative of the input message signal at input terminal 101, is fed to utilization device 114.

In many practical situations, it is necessary to retransmit the pulse code that represents the absolute magnitude of the input message signal to another distant location. The 8-bit pulse code appearing on the output leads of digital accumulator 111 is fed to encoder 115 in which the pulse code is converted to a digital format for transmission over transmission path 116. The received digital signal is decoded and converted to analog format by decoder 117. If transmission path 116 has the same information-carrying capacity as transmission path 105, then the 8-bit pulse code at the output of digital accumulator 111 may be encoded by encoder 115 in a manner similar to that employed at transmitter 100 without any loss of information. Thus at each sample instant, a digital difference signal may be transmitted by encoder 115 equivalent to the digital difference signal transmitted between transmitter 100 and receiver 109. Therefore, encoder 115 will not introduce additional quantization error. Thus the decoded analog signal at terminal 118 is equivalent to the analog signal fed to utilization device 114 and differs at each sample instant from the message signal at terminal 101 by the quantization error introduced by only sampler and quantizer circuit 103 at transmitter 100.

Often, however, because of multiplexing, the bandwidth of transmission path 116 may be narrower than the bandwidth of transmission path 105. Thus, whereas transmission path 105 may be able to transmit a digital signal having one of 24 possible levels at each sample, the bandwidth of transmission path 116 may be, for example, capable of transmitting a digital signal representing only one of 16 possible levels at each sample. Therefore, an additional quantization error is introduced by encoder 115 when the 24-level quality signal must be quantized to 16-level quality for retransmission over transmission path 116. At each sample instant, the analog signal at the output terminal 118 of decoder 117 will differ from the input message signal at terminal 101 by the quantization error introduced by sampler and quantizer circuit 103 plus the quantization error introduced by encoder 115. The resultant quantization error at output terminal 118 from the 24-level quantization at sampler and quantizer circuit 103, plus the quantization error from the 16-level quantization at encoder 115, is greater than the error that would have resulted had sampler and quantizer circuit 103 originally quantized the difference signal into 16 levels.

In order to reduce the quantization error of the analog signal at output terminal 118, sampler and quantizer circuit 103 could be modified to encode the difference signal at the output of subtractor circuit 102 into only 16 possible levels. Therefore encoder 115 would not introduce a quantization error that would cause the decoded signal at output terminal 118 to mistrack with the input message signal at terminal 101. The result of reducing the number of quantization levels of sampler and quantizer circuit 103, however, is to reduce the quality of the analog signal supplied to utilization device 114. Therefore, when sampler and quantizer circuit 103 employs 16-level quantization rather than 24-level quantization the signal supplied to utilization device 114 will not be as "close" to the input message signal. The conflict exists, therefore, for the desire of a high quality signal at utilization device 114, and the desire to prevent the introduction of additional quantization error by encoder 115.

Figure 2A:
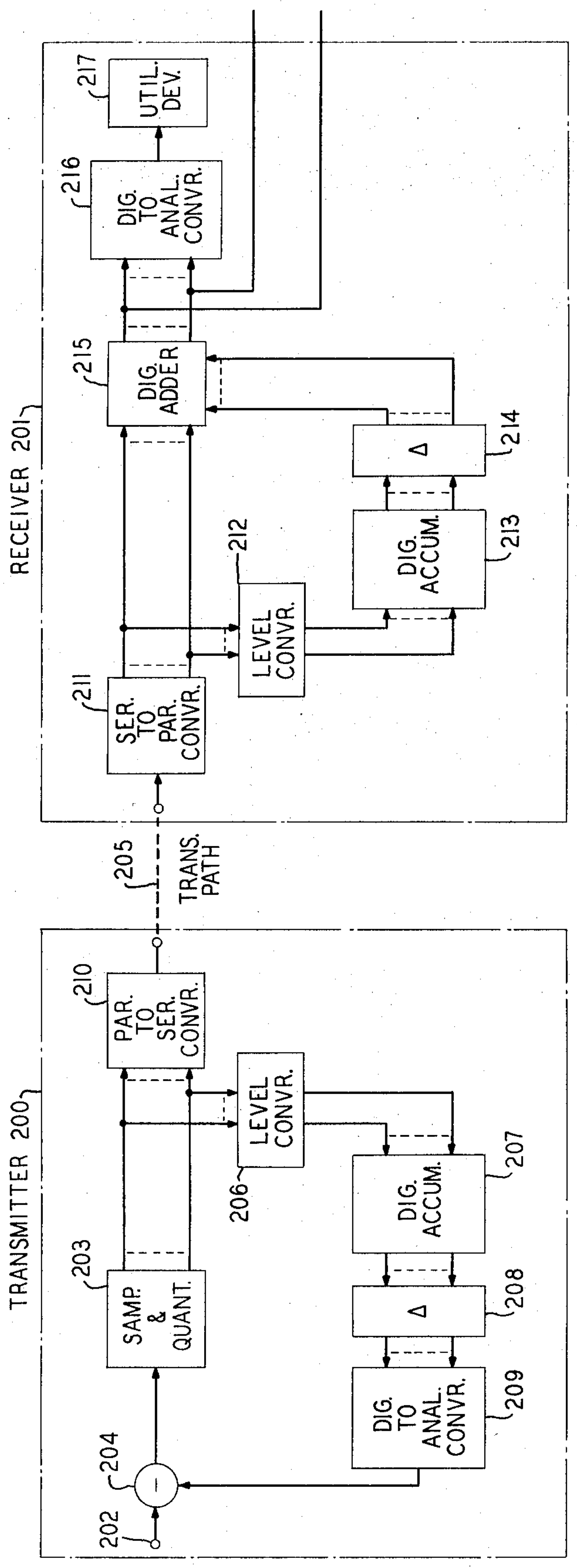
FIGS. 2A and 2B when
Figure 2B:
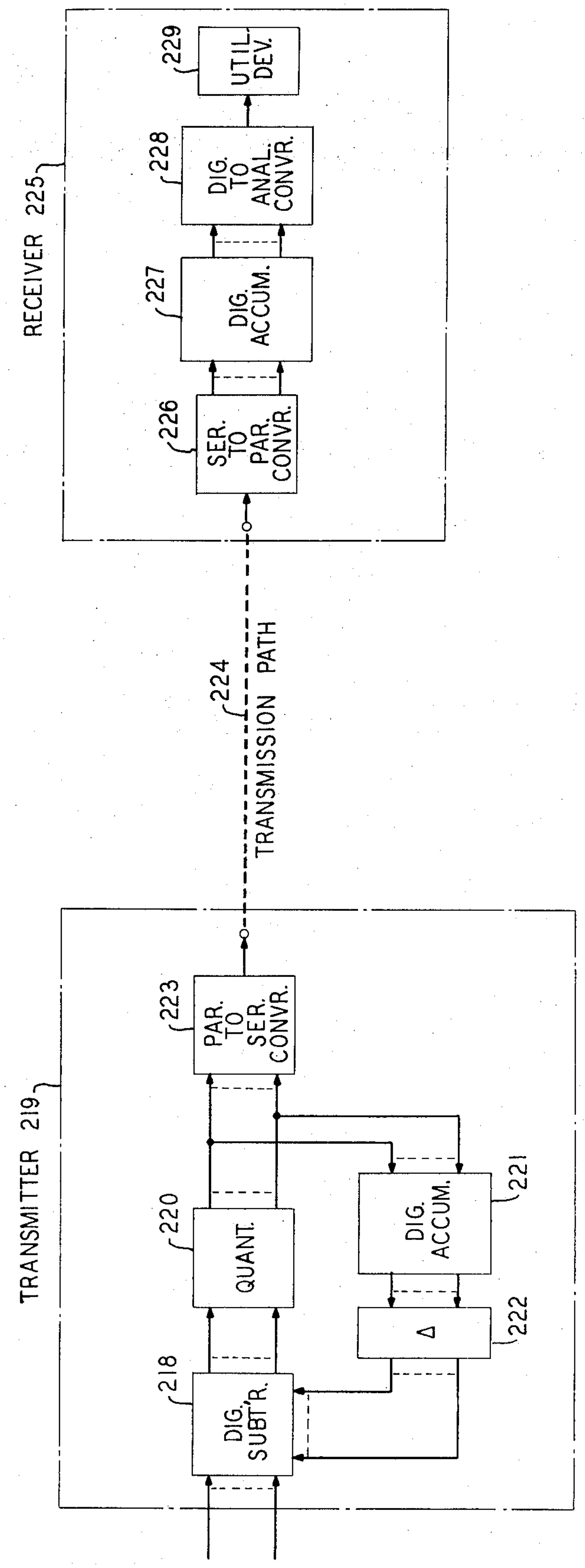

In the differential pulse code communications system embodying the present invention illustrated in the combination of FIGS. 2A and 2B, a difference signal is quantized in such a manner at transmitter 200 that the received digital signal at receiver 201 may be systematically degraded to a lower quality signal for retransmission without introducing additional quantization error. An analog message signal is applied to input terminal 202 and passed to sampler and quantizer circuit 203 through subtractor circuit 204. The difference signal at the output of subtractor circuit 204 is sampled at periodic intervals by sampler and quantizer circuit 203 and quantized to a signal having a predetermined number of discrete levels. The output of sampler and quantizer circuit 203 may be a pulse code appearing in parallel format on a set of output leads. The magnitude of each sampled difference signal, equal to one of the predetermined quantization levels, is represented by a unique combination of ON and OFF conditions of the output leads. This pulse code representation of the quantized signal may be in any one of several conventional quantizer techniques well known in the art. For present illustrative purposes, and consistency with the discussion of the prior art system of FIG. 1, it will be assumed that the sampler and quantizer circuit 203 quantizes the difference signal at the output of subtractor circuit 204 into one of 24 levels and represents the magnitude of the sampled difference signal by a pulse code on eight output leads. Parallel-to-serial converter 210, connected to the output leads of sampler and quantizer circuit 203, converts the pulse code appearing in parallel form on the output leads to a variable length code for a serial digital transmission over transmission path 205 to receiver 201.

The output leads of sampler and quantizer circuit 203 are also connected to level converter 206. Level converter 206 transforms the pulse code appearing on the output leads of sampler and quantizer circuit 203 to a second pulse code in parallel format; the second pulse code representing a quantization scheme having fewer quantization levels than the quantization scheme of sampler and quantizer circuit 203. For reasons that will be apparent hereinafter, the number of quantization levels at the output of level converter 206 is equivalent to the number of quantization levels to which the received signal at receiver 201 must be degraded for re-transmission. The level converter 206 may be any one of a number of such circuits well known in the art as, for example, a logic circuit, a switching matrix, or a "read-only" memory. An example of the latter could be the parallel connection of two 8-bit-to-4-bit integrated circuit packs designated SN 74187 by Texas Instrument, Inc. For present illustrative purposes it will be assumed that each input pulse code representing one of 24 quantization levels is transformed by level converter 206 to an output pulse code representing one of 16 quantization levels. The input and output pulse codes are represented by the ON an OFF conditions of 8 input and 8 output leads respectively. There is, therefore, a unique translation scheme so that for a given level on the 24-level scale, there is only one corresponding level on the 16-level scale. The output pulse code of level converter 206 represents the magnitude of the difference signal at the input to sampler and quantizer circuit 203 with the quality of 16-level quantization. Therefore, at each sample instant, the difference between an analog representation of the output of level converter 206 and the output of subtractor circuit 204, is the quantization error introduced by a 16-level quantizer.

The output leads of level converter 206 are connected to digital accumulator 207 in which the coded magnitudes of each level converted difference signal are digitally accumulated. At a given sample instant, the pulse code appearing on the eight output leads of digital accumulator 207 represents the absolute magnitude of the 16-level coded input message signal. Delay network 208 delays the pulse code appearing on the output of digital accumulator 207 by one sample instant. Digital-to-analog converter 209 converts the pulse code on the output leads of delay network 208 to an analog signal representative of the amplitude of the 16-level coded digital signal. The difference signal at the output of the subtractor circuit 204 is formed by subtracting the analog signal at the output of digital-to-analog converter 209 from the input message signal. The difference signal at the output of subtractor circuit 204 is therefore equal to the difference between the input message signal at a given sample instant and the analog representation of the absolute magnitude of the 16-level coded input message signal at the previous instant.

Figure 3:
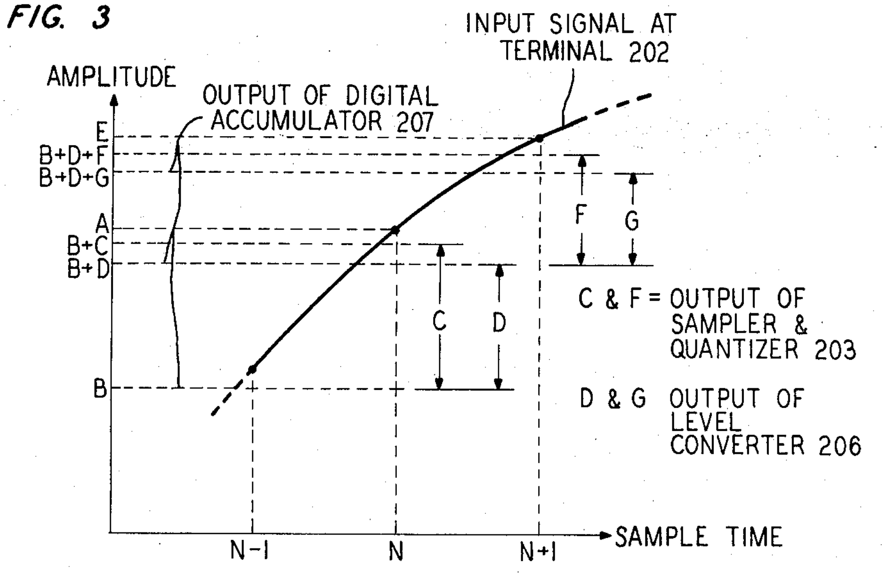
FIGS. 3, 4, 5 and 6 are waveforms and a chart useful in explaining the operation of the present invention.

An example of the quantizing process for an interval of an illustrative analog input message signal appearing at terminal 202 is illustrated in FIG. 3. At sample time N, the absolute value of the input message signal is shown to be A, while the amplitude of the signal fed back to subtractor circuit 204 from digital-to-analog converter 209 is given by B. Therefore, at sample time N, the magnitude of the difference signal at the output of subtractor circuit 204 is A - B.

Figure 4:
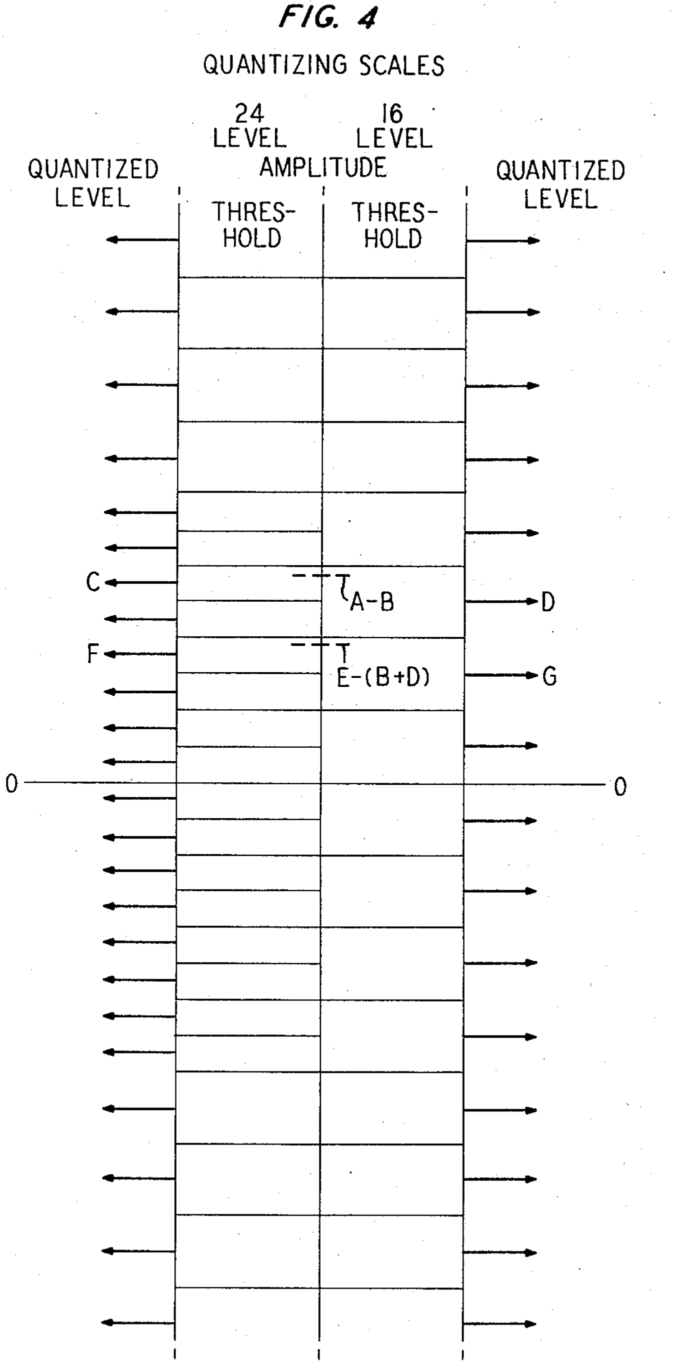

An example of a 24-level quantizing scheme is illustrated in FIG. 4 together with a corresponding 16-level quantizing scheme. Based upon 24-level quantizing scheme of FIG. 4, sampler and quantizer circuit 203 samples the difference signal at the output of subtractor circuit 204 and quantizes the difference A - B into a signal having a magnitude C. A pulse code representing C appears at the output of sampler and quantizer circuit 203. A digital signal representing the magnitude C is transmitted over transmission path 205 to receiver 201, while the parallel pulse code at the output of sampler and quantizer circuit 203 is fed to level converter 206. As shown in FIG. 4, the quantized level on the 16-level scale corresponding to C on the 24-level scale is D. Therefore, level converter 206 transforms the pulse code representing the quantized level C to a pulse code representing the quantized level D. As shown in FIG. 3, the pulse code representing D is added to the pulse code representing B, where B is the previous value in digital accumulator 207. Therefore, B + D is the 16-level representation of the absolute magnitude of the analog message signal at time N and B + C is the corresponding 24-level representation.

In FIG. 3 at the next sample instant of time, N + 1, the output of digital-to-analog converter 209 is equal to B + D. The signal at the output of subtractor circuit 204 is equal to the difference between E, the magnitude of the input message signal at sample time N + 1, and B + D. As illustrated in FIGS. 3 and 4, the difference between E and B + D is quantized into levels F and G on the 24-level and 16-level quantization schemes, respectively. Therefore at sample time N + 1, B + D + F is equal to the absolute magnitude of the 24-level quantized input signal and B + D + G is the absolute magnitude of the corresponding 16-level quantized input signal. The pulse code representing G, the 16-level quantized difference signal, is added to the pulse code representing B + D, the previous value of digital accumulator 207, to form a difference signal for the next sampling instant.

At a given sample instant, therefore, the absolute magnitude of the 24-level coded input signal equals the sum of the 24-level coded difference signal at that instant plus the absolute value of the 16-level coded input signal at the previous sample instant. Similarly, at a given sample instant the absolute magnitude of the 16-level coded input signal equals the sum of the level converted 16-level coded difference signal at that instant plus the absolute value of the 16-level coded input signal at the previous instant.

With reference again to FIG. 2A, the serial digital output of parallel-to-serial converter 210 is transmitted over transmission path 205. At receiver 201, serial-to-parallel converter 211 decodes the transmitted variable length code and produces a pulse code on the eight output leads equivalent to the 8-bit pulse code on the output leads of sampler and quantizer circuit 203. The output pulse code of serial-to-parallel converter 211 thus represents the 24-level quantized difference signal at the output of subtractor circuit 204.

The output leads of serial-to-parallel converter 211 are connected to level converter 212. Level converter 212 is similar in structure and function to the heretofore discussed level converter 206, and transforms each 8-bit input pulse code representing one of 24 quantization levels to an output 8-bit pulse code representing one of 16 quantization levels. For each 24-level pulse code appearing at the output of sampler and quantizer circuit 203 and serial-to-parallel converter 211, a pulse code appears on the output leads of level converters 206 and 212 representing the same quantization level on a 16-level quantizing scale.

The output leads of level converter 212 are connected to digital accumulator 213 and a pulse code is produced therein representing the summation of the magnitudes of the level converted transmitted difference signals. The delay network 214 delays the pulse code at the output of a digital accumulator 213 by one sample instant. It can be noted that the pulse code at the output of delay networks 214 and 208 represent the magnitudes of equivalent delayed 16-level coded signals. As discussed heretofore, the pulse code at the output of delay network 208, and therefore delay network 214, is representative of the absolute magnitude of the 16-level coded input signal.

The output leads of delay network 214 and the output leads of serial-to-parallel converter 211 are connected to digital adder circuit 215. At a given sample instant digital adder circuit 215 produces a pulse code representative of the summation of the 24-level quantized difference signal at that sample instant, plus the absolute magnitude of the 16-level quantized signal at the previous sample instant. The 8-bit pulse code appearing on the output leads of digital adder 215 is fed to digital-to-analog converter 216 and the analog signal produced therein, representative of the absolute value of the 24-level quantized input signal, is fed to utilization device 217.

Figure 5:
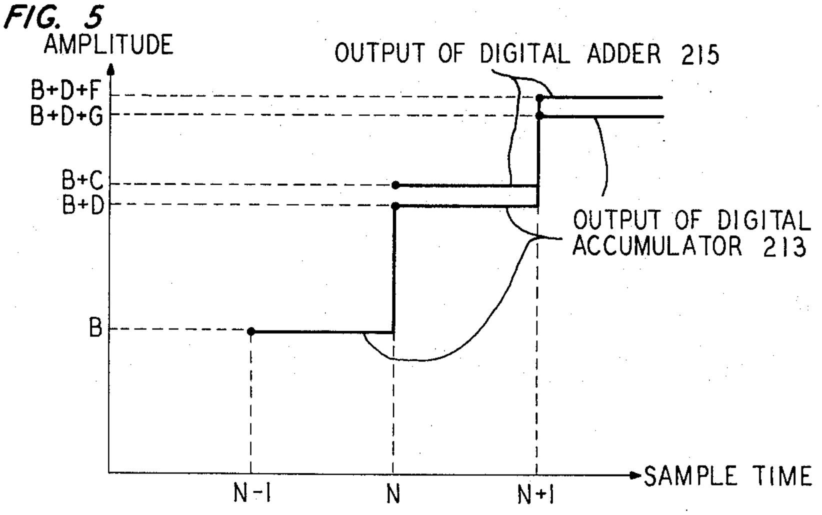

The decoding process for the input signal segment whose quantization was discussed in connection with FIG. 3 is illustrated in FIG. 5. At sample time N, the output of serial-to-parallel converter 211 is the quantized level C, and is equal to the quantization level at the output of sampler and quantizer circuit 203. As heretofore noted, the output of delay network 214 at receiver 201 is equivalent to the output of delay network 208 at transmitter 200 and at sample time N is equal to B, as shown in FIGS. 3 and 5. Therefore, at sample time N, the analog representation of the output of digital adder circuit 215 is equal to the output C of serial-to-parallel converter 211 plus the output B of delay network 214. Also at sample time N, the received quantized level C is converted by level converter 212 to quantized level D. As can be seen from the 24-level and the 16-level quantization schemes illustrated in FIG. 4, and as heretofore discussed in connection with FIG. 4, the quantized level C on the 24-level scale corresponds with level D on the 16-level scale. Therefore at sample time N, D, the output of level converter 212, is added to B, the previous value in digital accumulator 213.

At the next sampling instant at time N + 1, the received output of serial-to-parallel converter 211 is the quantized level F, as discussed in connection with FIG. 3. The output of delay network 214 at sample time N + 1 is equal to the output of digital accumulator 213 at sample time N which, as noted heretofore, equals B + D. The output of digital adder 215 is therefore equal to B + D + F as illustrated in FIG. 5. At time N + 1, the received quantization level F is also transformed by level converter 212 into level G as illustrated in FIGS. 3, 4 and 5.

It will be noted that at each sample instant, the pulse code at the output of digital adder circuit 215 represents the absolute magnitude of the 24-level coded input message signal and the output of digital accumulator 213 represents the absolute magnitude of the 16-level coded input message signal. Therefore at receiver 201 in FIG. 2A, a 24-level reconstruction of the input message signal may be made by digital-to-analog converter 216 for supply to utilization device 217. As heretofore noted, however, the digital signal at receiver 201 may have to be re-transmitted to another distant location over a transmission path having a narrower bandwidth than transmission path 205. Thus the number of bits that may be re-transmitted is insufficient for encoding a 24-level signal but may be sufficient for encoding a 16-level signal. Since, as heretofore noted, the absolute magnitude of the 24-level quality signal at the output of digital adder is the sum of the absolute level of the 16-level quality signal plus a 24-level difference signal, the 16-level signal may be derived therefrom for re-transmission.

With reference again to the combination of FIGS. 2A and 2B, the 8-bit pulse code on the output leads of digital adder circuit 215 is passed through digital subtractor circuit 218 to quantizer circuit 220 in transmitter 219. The pulse code on the output leads of digital subtractor circuit 218, representing the difference between the absolute magnitude of the 24-level coded signal at the output of digital adder circuit 215, and the signal fed back from digital accumulator 221, is quantized by quantizer circuit 220. The absolute magnitude of the digital signal at the output of digital subtractor circuit 218 is quantized into a digital signal having 16 quantization levels. The output leads of quantizer 220 are connected to serial-to-parallel converter 223 in which the 8-bit parallel pulse code at the output of quantizer circuit 220 is converted to a variable length serial digital code for transmission over transmisison path 224 to receiver 225.

The output pulse code of quantizer circuit 220 is also fed to digital accumulator 221 and a pulse code is produced therein representative of the sum of the 16-level quantized difference signal. The output pulse code of digital accumulator 221 is delayed one sample instant by delay network 222 and the delayed accumulated pulse code is then fed to a second input of digital subtractor circuit 218. The output of digital subtractor circuit 218 is therefore the difference between the digital representation of the absolute value of the 24-level coded input signal at a given sampling instant and the digital representation of the absolute value of the 16-level coded input signal at the previous instant. As heretofore noted, the absolute magnitude of the 24-level coded signal at a given sample instant, equals the sum of the 24-level coded difference signal at that instant, and the absolute magnitude of the 16-level coded signal at a previous instant. Therefore, the digital signal at the output of digital subtractor circuit 218 represents the 24-level coded difference signal. Therefore, quantizer circuit 220 transforms the 24-level coded difference signal to the corresponding level on the 16-level quantization scale. Thus, at each sample instant, the output of quantizer 220 is a digital signal representative of the 16-level coded difference signal and is equivalent to the 16-level coded difference signal at the outputs of both level converters 206 and 212. Since the signal input to parallel-to-serial converter 223 is equal to the output of level converter 212, the output of level converter 212 could be tapped directly to parallel-to-serial converter 223. The remaining components of transmitter 219 would then be eliminated.

The digital signal received at receiver 225 by serial-to-parallel converter 226, is converted to a parallel pulse code representing the output of quantizer 220. Digital accumulator 227 connected to the output leads of serial-to-parallel converter 226 produces a pulse code representing the sum of the received 16-level difference signals. Therefore, the output of digital accumulator 227, equivalent to the outputs of digital accumulators 207, 213 and 221, represents the absolute magnitude of the 16-level coded input signal. Digital-to-analog converter 228, connected to the output leads of digital accumulator 227, converts the pulse code representing the accumulated 16-level difference signals into analog format which in turn is fed to utilization device 229.

At each sample instant, the difference between the analog signal at the output of digital-to-analog converter 228, and the input message signal at terminal 202 is equivalent to the 16-level quantizer error introduced at transmitter 200 by sampler and quantizer circuit 203 and level converter 206. Further, the 24-level signal supplied to utilization device 217 is not limited by the constraints of transmission path 224.

Figure 6:
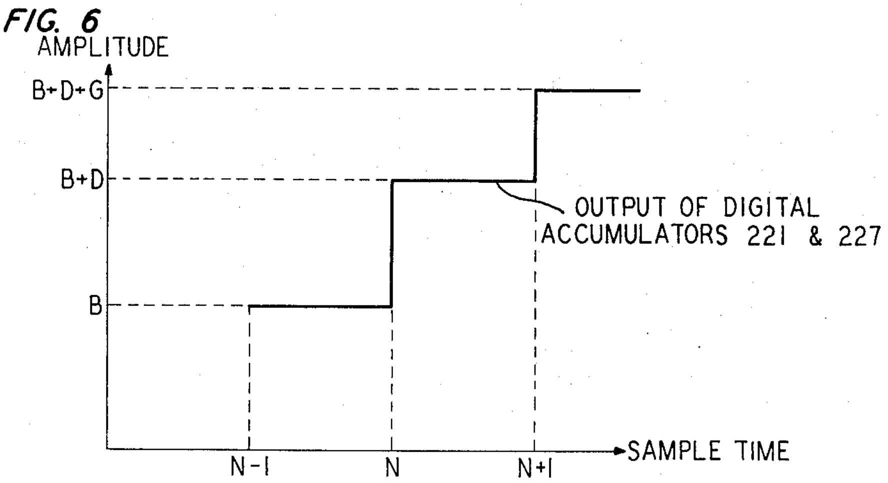

The quantizing and decoding processes at transmitter 219 and receiver 225 corresponding to the input signal segments of FIGS. 3 and 5 is illustrated in FIG. 6. It can be noted from FIG. 5 that at sample time N the output of digital adder circuit 215 is equal to B + C. As heretofore noted, the output of delay network 222 at transmitter 219 is equivalent to the output of delay network 206 in transmitter 200, and is therefore equal to B as shown in FIGS. 3, 5 and 6. Therefore at sample time N, the output of digital subtractor circuit 218 is equal to C. Quantizer circuit 220 quantizes C in accordance with the 16-level quantizing scale illustrated in FIG. 4 to quantized level D. At the same instant, the quantized level D is added to B, the previous value in digital accumulators 221 and 227. Thus the outputs of digital accumulators 221 and 227 at sample time N are both equal to B + D. At the next sample instant at time N + 1, the output of digital adder circuit 215 is equal to B + D + F. Therefore, the output of digital subtractor circuit 218 is equal to the difference between B + D + F and B + D. The difference F is quantized by quantizer circuit 220 to level G on the 16-level scale. The outputs of digital accumulator 221 at transmitter 219 and digital accumulator 227 at receiver 225 at sample time N + 1 are therefore both equal to B + D + G as illustrated in FIG. 6. Therefore in FIGS. 2A and 2B, the analog signal reconstructed by digital-to-analog converter 228 has a quantization error at each sample instant equivalent to the quantization error introduced at transmitter 200 by the combination of sampler and quantizer circuit 203 and level converter 206. The decoded analog signal therefore has a 16-level quality and transmitter 219 has not introduced a second quantization component into the system.

In summary, a 24-level quality digital signal has been received by receiver 201 and a 16-level quality digital signal has been received by receiver 225 by employing the heretofore described method for quantizing an input signal of the present invention.

Various other modifications of the present invention may be made without departing from the spirit and scope of the present invention. For example in FIG. 2A, the input signal at terminal 202 may be a high quality digital signal rather than an analog signal. In that case subtractor circuit 204 would be replaced by a digital subtractor circuit and the output of delay network 208 would be connected directly to the digital subtractor circuit. A quantizer circuit would quantize the resultant digital difference and produce a digital signal having, for example, 24 discrete levels.

The above-described embodiment is illustrative of the application of the principles of the invention. Other embodiments may be devised by those skilled in the art without departing from the spirit and scope thereof.

What is claimed is:

1. A transmitter for transmitting coded differential signals comprising a transmitter input terminal for receiving an input message signal, sampling and quantizing means for sampling and encoding a differential input signal to a first digital signal having one of a first predetermined number of quantizing levels, a transmitter output terminal connected to the output of said sampling and quantizing means, a level converter connected to the output of said sampling and quantizing means to convert said first digital signal to a second digital signal having one of a second predetermined number of quantizing levels, said seocnd predetermined number of quantizing levels being less than said first predetermined number of quantizing levels, a digital accumulator connected to said level converter for adding the quantizing level of said second digital signal to previously accumulated quantizing levels of said second digital signals, a delay network connected to said digital accumulator to delay said accumulated second digital signal one sample time, and means connected to said transmitter input terminal, the output of said delay network, and the input of said sampling and quantizing means to produce said differential input signal by subtracting the delayed signal from said input message signal, whereby a signal having said first predetermined number of quantizing levels and a signal having said second predetermined number of quantizing levels may be derived from the signal at said transmitter output terminal.

2. A transmitter for transmitting coded differential signals in accordance with clain 1 wherein said input message signal is an analog signal, and a digital-to-analog converter is connected between said delay network and said means to produce said differential input signal for converting said delayed accumulated second digital signal to analog format.

3. A transmitter for transmitting coded differential signals in accordance with claim 2 wherein a parallel-to-serial converter is connected between said sampling and quantizing means and said transmitter output terminal to convert said first digital signal to serial digital format for transmission.

4. A receiver for receiving coded differential signals of a message signal comprising a receiver input terminal for receiving at predetermined sampling periods a transmitted differential signal having one of a first predetermined number of quantizing levels, a level converter connected to said receiver input terminal to convert said received digital differential signal to a second digital signal having one of a second predetermined number of quantizing levels, said second predetermined number of quantizing levels being less than said first predetermined number of quantizing levels, a digital accumulator connected to said level converter for adding the quantizing level of said second digital signal to previously accumulated quantizing levels of said second digital signal, a delay network connected to said digital accumulator to delay said accumulated second digital signal at least one of said predetermined sampling periods, a digital adder having a first input connected to said receiver input terminal and a second input connected to said delay network to sum said received digital differential signal and said delayed accumulated second digital signal, and a receiver output terminal connected to the output of said digital adder whereby a signal having said first predetermined number of quantizing levels and a signal having said second predetermined number of quantizing levels may be derived from the signal at said receiver output terminal.

5. A receiver for receiving coded differential signals in accordance with claim 4 wherein said message signal is an analog signal, and a digital-to-analog converter is connected between said digital adder and said receiver output terminal to convert the digital signal at the output of said digital adder to analog format.

6. A receiver for receiving coded differential signals in accordance with claim 5 wherein a serial-to-parallel converter is connected to said receiver input terminal, said first input of said digital adder, and said level converter to convert said received digital differential signal to parallel digital format.

7. A differential pulse code communications system for transmitting and receiving coded differential signals comprising a transmitter input terminal for receiving an input message signal, sampling and quantizing means for sampling and encoding a differential input signal to a first digital signal having one of a first predetermined number of quantizing levels, a transmitter output terminal connected to the output of said sampling and quantizing means, a first level converter connected to the output of said sampling and quantizing means to convert said first digital signal to a second digital signal having one of a second predetermined number of quantizing levels, said second predetermined number of quantizing levels being less than said first predetermined number of quantizing levels, a first digital accumulator connected to said first level converter for adding the quantizing level of said second digital signal to previously accumulated quantizing levels of said second digital signal, a first delay network connected to said first digital accumulator to delay said accumulated second digital signal one sampling time, means connected to said transmitter input terminal, the output of said first delay network, and the input of said sampling and quantizing means to produce said differential input signal by subtracting the delayed signal from said input message signal, a receiver input terminal, a transmission medium interconnecting said transmitter output terminal and said receiver input terminal for transmitting the signal at said transmitter output terminal to said receiver input terminal, a second level converter connected to said receiver input terminal to convert the received digital signal at said receiver input terminal to a third digital signal having one of said second predetermined number of quantizing levels, a second digital accumulator connected to said second level converter for adding the quantizing level of said third digital signal to previously accumulated quantizing levels of said third digital signal, a second delay network connected to said second digital accumulator to delay said accumulated third digital signal one sample time, a digital adder having a first input connected to said receiver input terminal and a second input connected to said delay network to sum the received digital difference signal and said delayed accumulated third digital signal, and a receiver output terminal connected to the output of said digital adder whereby a signal having a first predetermined number of quantizing levels and a signal having said second predetermined number of quantizing levels may be derived from the signal at said receiver output terminal.

8. A differential pulse code communications system in accordance with claim 7 wherein said input message signal is an analog signal, a first digital-to-analog converter is connected between said first delay network and said means to produce said differential input signal to convert said delayed accumulated second digital signal to analog format, and a second digital-to-analog converter is connected between said digital adder and said receiver output terminal to convert the signal at the output of said digital adder to analog format.

* * * * *